United States Patent

Ho et al.

[15] 3,662,351

[45] May 9, 1972

[54] ALTERABLE-LATENT IMAGE MONOLITHIC MEMORY

[72] Inventors: Irving T. Ho, Poughkeepsie; Gerald A. Maley, Fishkill; Ronald Waxman, Poughkeepsie, all of N.Y.

[73] Assignee: International Business Machines Corporation, Armonk, N.Y.

[22] Filed: Mar. 30, 1970

[21] Appl. No.: 23,609

[52] U.S. Cl.......................340/173 FF, 307/238, 340/173 SP

[51] Int. Cl.....................................G11c 11/00, G11c 17/00

[58] Field of Search.................340/173 FF, 173 SP; 307/238

[56] References Cited

UNITED STATES PATENTS 3,493,786 2/1970 Ahrons et al......................340/173 SP 3,292,008 12/1966 Rapp................................340/173 FF 3,355,721 11/1967 Burns...............................340/173 FF 3,535,699 10/1970 Gaensslen et al..................340/173 FF

*Primary Examiner*—Maynard R. Wilbur

*Assistant Examiner*—Joseph M. Thesz, Jr.

*Attorney*—Hanifin and Jancin and Kenneth R. Stevens

[57] ABSTRACT

A monolithic latent image memory is one having a plurality of bistable memory cells. Selected bistable memory cells include AC impedance means which are responsive at the transition from non-sustaining voltage level to an operating level so as to set the selected memory cells to a first predetermined state and thus provide a monolithic memory which is capable of functioning in a read-only and a read-write mode. The read-only state is selectively alterable by employing an AC impedance means which is multi-valued.

7 Claims, 8 Drawing Figures

INVENTORS
IRVING T. HO
GERALD A. MALEY
RONALD WAXMAN
BY Kenneth P. Stevens
ATTORNEY

ALTERABLE-LATENT IMAGE MONOLITHIC MEMORY

RELATED APPLICATIONS

U.S. application Ser. No. 023,671 filed in the U.S. on Mar. 30, 1970 and assigned to the assignee of the present application, also discloses a latent image monolithic-type memory.

BACKGROUND OF THE INVENTION

The present invention relates to a monolithic memory and more particularly to a monolithic memory having a plurality of memory cells operating in a read-write and a read-only mode.

Presently there are two general types of monolithic memories which are being implemented in large-scale integration (LSI) technologies: Read-write and read-only memories. The read-write memory possesses the conventional characteristics of being capable of having information written into and stored in its various memory locations. At a later time, the information may be read from the different storage locations. A read-only memory (ROM) normally has information stored therein in a fixed type manner and thereafter is responsive only to read information out of its various storage locations upon request.

One illustration of a system which employs both a read-only and a random access read-write memory is depicted in FIG. 1. In starting up a computer from a power off or cold start state, it is normal to transfer information to the random access memory (RAM) from another device exemplified by an ROM. A read-only memory containing the desired start-up program transfers instructions through the central processing unit to RAM. Thus, the program information initially stored in the ROM is transferred to the random access read-write memory via the central processing unit. Clearly, this system required both a separate read-only and a random access read-write memory. A memory which has the capability of functioning as a read-write memory and also as a latent image or read-only memory is highly desirable. Reduced costs, size and system complexity would result from a memory which could operate in this manner.

A latent image memory would also have very useful application wherein programmed tables are stored in the main memory but are not always needed, or when programs are needed by maintenance personnel for diagnostic functions. In other words, a latent image memory is capable of operating in a conventional read-write mode. However, when power is turned on, selected areas in memory always return to a predetermined latent image or stored information state regardless of the state of the selected memory area just prior to the power being removed or turned off.

The asymmetrical nature of a trigger or bistable circuit per se is well-known. For example, in the "Handbook of Semiconductor Electronics," Hunter, Second Edition, pp. 15–20 through 15–34, various means are discussed for insuring reliable steady-state operating conditions. That is, in a steady-state operating condition, it is necessary that the trigger or bistable circuit be balanced so as not to switch state and thus destroy information which is stored therein. Similarly, after the information or trigger signal is applied to change the state of the trigger or bistable circuit, it should remain in the state until receipt of the next information or trigger signal. Accordingly, as previously known, structural circuit inbalance constituted a disadvantage because this condition tends to make the trigger or bistable circuit unstable or unreliable when used as a storage element. The present invention controls the degree of inbalance and uses it advantageously when applied to memory arrays. A condition which was previously considered a problem is now controlled and transformed into an advantage in the present invention relating to memory arrays.

In addition, it is generally undesirable to intentionally fabricate a bistable cross-coupled type monolithic memory cell in which one side of the cell possesses dissimilar DC electrical characteristics from the other side of the bistable cell. For example, in a cross-coupled bistable cell which includes load resistors connected to the power supply, resistor inbalance causes a DC asymmetrical condition to exist between each side of the bistable circuit. This DC asymmetrical condition provides a problem when the bistable cells are arranged in a memory array. The DC asymmetrical condition causes different valued currents to flow through a single cell depending on which side of the cell is conductive and this fact is a disadvantage when the memory array is interconnected to driving and sensing circuitry. The driving circuitry is necessary to provide driving current to the memory array. The sensing circuitry is used to sense the state of a cell. Greater tolerance restrictions are placed on the driving circuitry if it must supply different valued currents. Naturally this fact increases the complexity and the cost of the driving circuitry. Similarly, the sensitivity and the tolerance restrictions on the sensing circuitry is critical when different valued sensing currents are produced when reading from a cell. The tolerance limitation requires more costly and complex sensing circuitry. The decrease in sensitivity of the sensing circuitry, of course, decreases the noise tolerance level of the overall system. Accordingly, it is desirable to provide a latent image memory array without altering the DC characteristics of the bistable cell. Such a problem is avoided by utilizing the AC parasitic impedance inherent in an integrated circuit.

Further, it would be highly desirable to provide a monolithic array having a read-write and a read-only capability in which the read-only state is alterable. Such a feature would be highly advantageous since it would provide much greater flexibility to the overall memory array. Such an advantage would be particularly significant when its implementation neither adversely affects the DC operating characteristics of the monolithic array nor renders it incompatible with existing monolithic processing technologies.

SUMMARY OF THE INVENTION

It is an object of this invention to provide a memory array in which the same storage locations are capable of functioning in both a read-write and a read-only mode.

Another object of this invention is to provide a memory in which predetermined locations in memory return to a predefined state when the power is turned on, without write signals, regardless of the state of the predetermined locations just prior to the power being turned off.

Another object of this invention is to provide a memory array in which the same storage locations are capable of functioning in both a read-write and a read-only mode without interferring with the DC operating characteristics of the storage locations.

A further object of the present invention is to provide an integrated circuit memory array in which the same storage locations are capable of functioning in both a read-write and a read-only mode by adding an AC parasitic impedance associated with the integrated circuit.

A further object of the present invention is to provide a memory array in which the same storage locations are capable of functioning in both a read-write and a read-only mode and in which the read-only mode is selectively alterable.

Another object of this invention is to provide a memory in which the same storage locations are capable of functioning in both a read-write and a read-only mode and in which the read-only mode is selectively alterable in accordance with the application of a polarizing signal.

The present invention comprises a monolithic latent image memory comprising a plurality of $m$ memory cells for receiving information. Accessing means operatively connects to the $m$ memory cells for reading and writing information. Unbalancing means is operatively connected to $n$ of said $m$ memory cells. The unbalancing means is responsive at a transition from the non-sustaining or power-off level to the operating level for setting each of the n memory cells to a first predetermined state so that the n memory cells operate in both a read-write and a read-only mode. The read-only mode is selectively alterable by employing an unbalancing means which may comprise a variable integrated circuit parasitic capacitor.

DESCRIPTION OF THE DRAWINGS

The foregoing and other objects, features, and advantages of the invention will be apparent from the following more particular description of the preferred embodiments of the invention as illustrated in the accompanying drawings in which.

DESCRIPTION OF PREFERRED EMBODIMENTS

Figure 1:
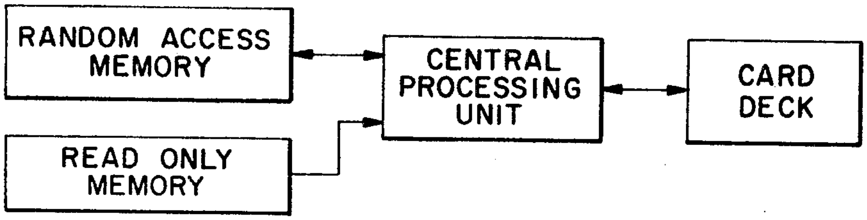
FIG. 1 is a schematic block diagram of a prior art system which requires separate read-write and a read-only memory.
Figure 2:
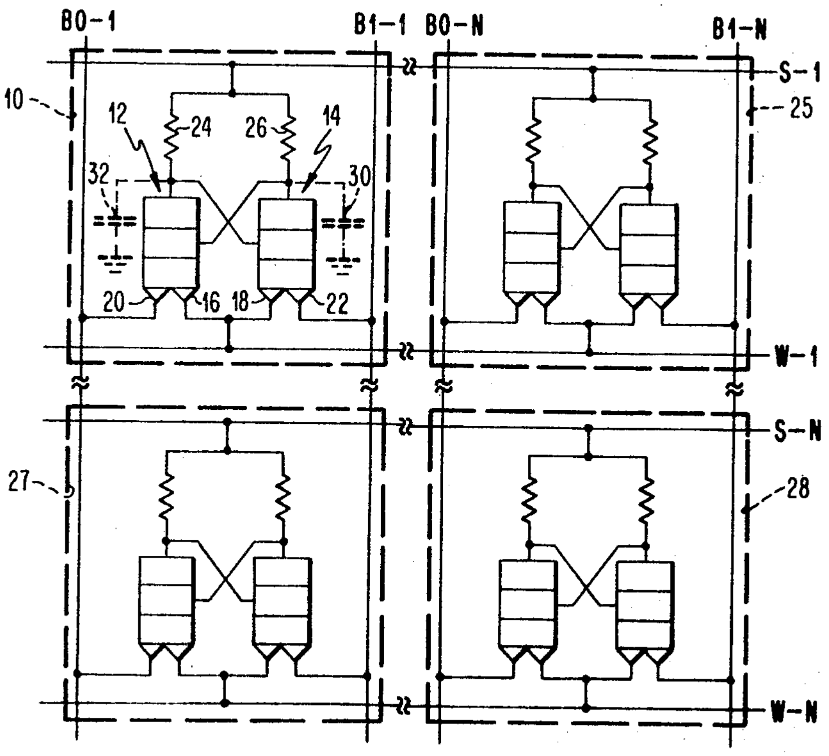
FIG. 2 is a schematic diagram illustrating a portion of a monolithic memory having latent image characteristics.

Now referring to FIG. 2, it illustrates a portion of a monolithic memory which possesses read-write and latent image or read-only characteristics. A bi-level power supply operates at 1.9 volts during the read and write operations of the memory array and at 0.8 volts during the standby or hold state. The power supply connects to each of the horizontal rows by way of lines S–1 . . .S–N where N equals 1,2, . . .N. The memory array includes accessing lines comprising the bit "0" accessing lines B0–1. . .B0–N, and the bit "1" accessing lines B1–1 . . .B1–N which connect to gating signals. Similarly, the horizontal accessing lines W–1 . . .W–N also connect to gating signals and are powered up during the reading or writing operation.

A plurality of m bistable memory cells constitute the array of the memory. Taking the upper left hand cell 10 as illustrative, each cell comprises a left hand multi-emitter NPN transistor 12 which is directly cross-coupled to a right hand multi-emitter NPN transistor 14. A pair of inner emitter terminals 16 and 18 are directly interconnected to their respective horizontal accessing line W–1. Similarly, a pair of outer emitter terminals 20 and 22 are connected to their respective vertical accessing lines BO–1 and B1–1. By designation, the left hand section which includes transistor 12 is used to store a binary "0" while the right hand section including transistor 14 is used to store a binary "1." A pair of resistors 24 and 26 interconnect between the power supply line S–1 and the collector terminals of transistors 12 and 14, respectively. In this embodiment, the resistors 24 and 26 are selected to have identical ohmic values. Neglecting other parameters, this fact insures that identical collector current will flow in either resistor 24 or resistor 26 depending on the binary state of the cell 10. The other collector resistors generally shown in cells 25, 27, and 28 are also selected to have identical ohmic values so as to insure symmetry with respect to the DC operating conditions.

Figure 3:
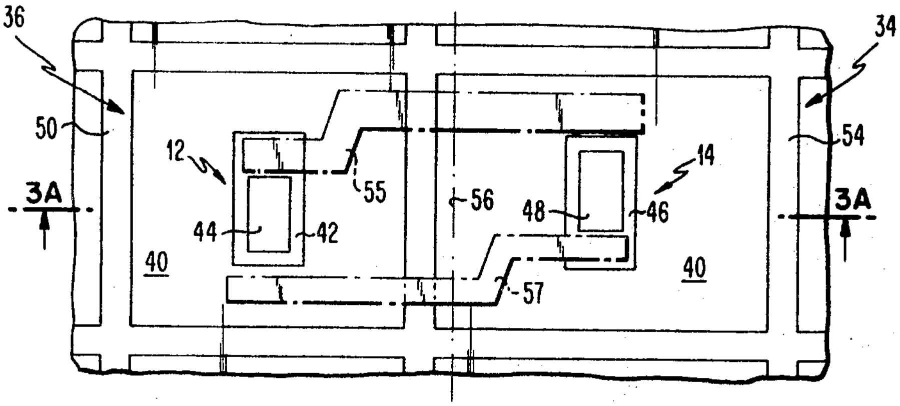
FIGS. 3 and 3A show a plan and a cross-sectional view of a portion of a monolithic circuit illustrating the left and right hand sections of a cross-coupled bistable cell in which the isolation regions are displaced from center in order to introduce an unbalancing AC parasitic capacitance into the memory cell.
Figure 3A:
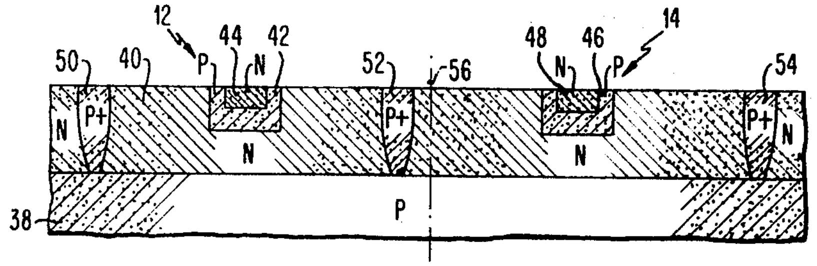

In order to store a latent image in the selected n of the m memory cells, an unbalancing AC impedance means is intentionally added to the cell. In order to store a latent image corresponding to a binary "1" in the cell 10, capacitor 30 is selected to have a larger value than capacitor 32. Capacitors 30 and 32 actually constitute the collector to substrate parasitic capacitance of a monolithic integrated circuit and accordingly do not affect the DC operation of the cell 10. One means of selectively adjusting the value of the collector to substrate parasitic capacitance is shown in FIGS. 3 and 3A.

Area 34 corresponds to the right hand section of cell 10 while area 36 corresponds to the left hand section of the same cell. The entire device implementation of cell 10 is not illustrated for purposes of simplicity, but only that which is necessary to show one possible way of adjusting the value of the collector to substrate parasitic capacitance is illustrated. A P-type substrate 38 supports an N-type epitaxial collector region 40. A portion of multi-emitter transistor 12 is shown as being constituted by a P-type base region 42 and an N-type emitter region 44. A portion of the multi-emitter transistor 14 is illustrated as comprising a P-type base region 46 and an N-type region 48. A plurality of P+ isolation regions are shown at 50, 52, and 54.

Center line 56 is centrally disposed between the device transistors 12 and 14. Normally, the isolation region 50, 52, 54 are centrally located with respect to line 56. By intentionally displacing the isolation region 52 to the left of center line 56, the parasitic collector to substrate capacitance is increased in the right hand section 34 because there is a greater junction area between the substrate to collector in that section. As it relates to the cell 10 in FIG. 2, the capacitor 30 is of a larger capacitive value than the capacitor 32.

The isolation regions 50, 52, and 54 are shown formed in an N-type epitaxial collector region 40. However, increasing the collector to substrate capacitor is equally applicable to P-type epitaxial base structures; although, in this case some sacrifice is required because the transistors of a cell cannot be separated by a common isolation such as region 52. Thus greater area is required.

The use of a parasitic AC impedance 2 provide the unbalance or asymmetry is highly advantageous, in addition to the fact that the DC operating characteristics of the cell are not deleteriously affected. The relative difference between the value of capacitors 30 and 32 can be made very small. Actual differences in value is in the range of a few tenths of one picofarad. The major parameters which vary in a cell such as 10 are the load resistors 24 and 26 and the base to emitter voltage drops, $V_{BE's}$. Ideally, these values would be identical for both the the left and right hand sections. In such a case, a minimal difference between the value of capacitors 30 and 32 is effective to store a latent image. The maximum difference in value between capacitors 30 and 32 which would be necessary to store a latent image is dependent upon the tolerance control associated with the applicable fabrication process technology. But even for the worst case, it has been determined that a very small inbalance between the collector to substrate capacitance is effective to store a latent image.

Another method of making the parasitic base to collector capacitor 30 larger than capacitor 32 is to make metallic collector interconnector 55 larger than metallic collector interconnector 57. This alternative method is illustrated by the different sized interconnectors 55 and 57 shown in phantom.

Figure 4:
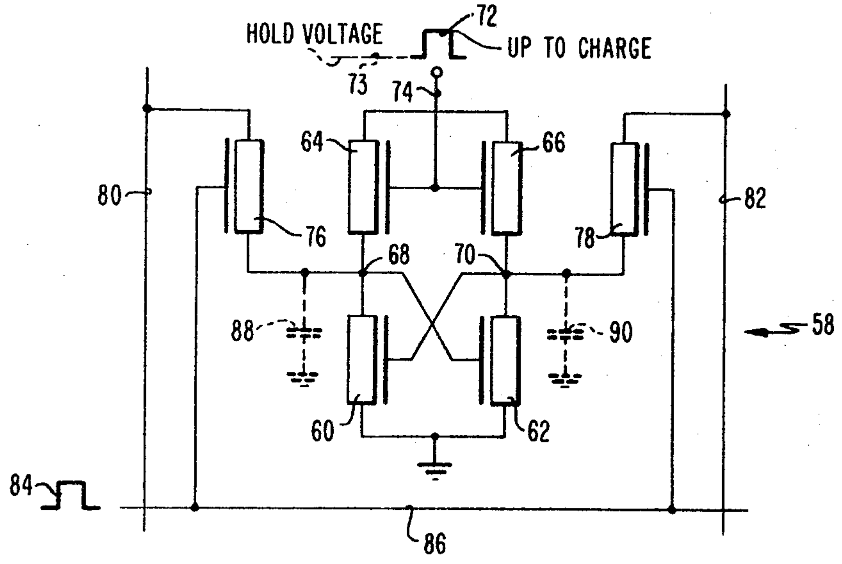
FIG. 4 is a schematic diagram illustrating a portion of monolithic memory having latent image characteristics and which taken in conjunction with FIGS. 4A and 4B illustrate the manner in which the latent image characteristic is selectively alterable.

FIG. 4 shows a schematic diagram of a bistable memory cell 58 comprising field-effect transistors (FET). The bistable memory cell 58 is comparable to the single memory cells shown as 10, 24, 26, and 28 in FIG. 2 and is adaptable for organization into a memory array.

The memory cell 58 comprises a pair of cross-coupled FET transistors 60 and 62. Load FET transistors 64 and 66 are each connected to nodes 68 and 70, respectively. The gate terminals of FET transistors 64 and 66 are selectively connected to a charging pulse 72 via line 74. In order to access the bistable circuit FET transistors 76 and 78 are each connected between line 80 and node 68 and line 82 and node 70, respectively.

Figure 4A:
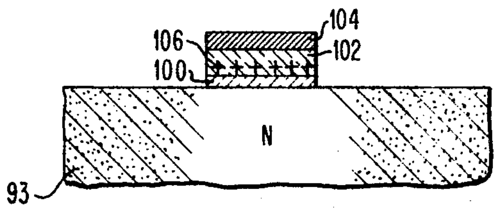

In order for the memory array to function as a read-write and a read-only mode and also in an alterable read-only mode, two alterable capacitors 88 and 90 of memory cell 58 are implemented in integrated circuit from as shown in FIG. 4A. The FET transistors in cell 58 are N channel enhancement mode devices, but other forms, such as, P channel or depletion mode devices are equally applicable. An N silicon substrate 93 is used to fabricate the numerous FET transistors and also the parasitic type capacitors 88 or 90. The bottom layer 100 is an oxide, e.g., silicon dioxide between 500 and 1,000 A. thick. Formed on top of the silicon dioxide layer 100 is another layer 102, such as silicon nitride. Finally on top of the silicon nitride layer 102 is an aluminum contact layer 104. The particular materials are illustrative but in combination form a MNOS structure.

Figure 4B:
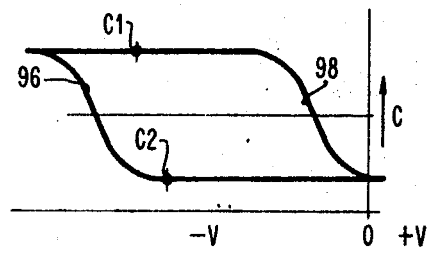

As known in the prior art, MNOS structures have the capability to hold information for a few thousand hours. The physical model of this memory effect is believed to be formed by a heavy concentration of donor-type traps existing at the $SiO_2$-$Si_3N_4$ boundary 106. When a strong polarization electric field is applied across the insulators, these traps may be charged or discharged according to the polarity of the polarization field. The result is that the capacitance between the metal and the silicon underneath will be smaller or larger than that when the traps remain neutral at a certain range of voltage as shown in FIG. 4B. When a negative polarization pulse is applied to the capacitor 88 or 90 the traps at 106 will be charges and the C–V curve will follow the path 96. On the other hand, when a positive polarization pulse is applied the C–V curve will follow path 98. The hysteresis type loop exhibited by the MNOS structure allows the capacitor 88 or 90 to be set to a preferred $C_1$ or a $C_2$ state in accordance with latent image binary state which is to be stored. The latent image stored in cell 58 can be altered as desired. The amplitude of the polarization pulse of capacitor 88 or 90 is not sufficient to alter the threshold voltage of transistors 60 and 62 because of different insulation used for the transistors in contrast to that used for the capacitors 88 and 90.

OPERATION

Figure 2A:
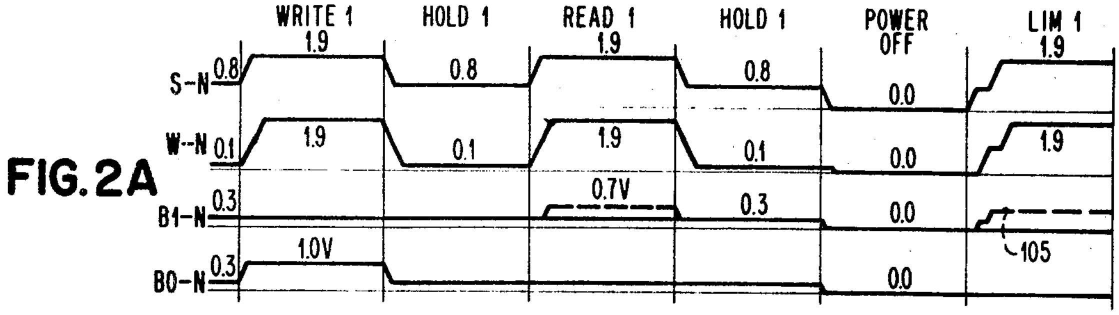
FIG. 2A illustrates the signal levels which are employed on the accessing lines and the power supply lines in the circuit of FIG. 2 for purposes of explaining its operation.

Since the memory array operates in a bi-level power mode, the selected S–N line is brought to an up state of approximately 1.9 volts during a read or write operation, illustrated in FIGS. 2 and 2A. During the stand-by or hold state the S–N line is returned to a value of approximately 0.8 volts. By designation, a binary "0" is stored in the cell when the left hand transistor 12 is conducting, and a binary "1" is stored in the cell when the transistor 12 is non-conducting, and the transistor 14 is conducting. The accessing operation for the illustrative upper left hand cell 10 is explained by assuming that a binary "0" is initally stored therein.

In order to write a binary "1" into the cell, the S–1 and the W–1 lines are brought to an up state. The BO–1 line is raised to 1.0 volts and the B1–1 is maintained at approximately 0.3 volts. Accordingly, the emitter terminal 22 is now at a significantly lower voltage than the outer emitter terminal 20. Both emitter terminal 16 and 20 of the previously conducting transistor 12 are now at a substantially higher voltage level. This new condition tends to block the flow of current through transistor 12 and thus it begins to go toward a non-conductive state. As transistor 12 becomes increasingly non-conductive, the voltage at its collector node rises. This rise in voltage is transmitted to the base of transistor 14 via the direct cross-coupling connection. The increased voltage at the base of transistor 14 and the lower potential at the emitter terminal 22 are effective to forwardly vias transistor 14, and it thus begins to conduct. In a positive regenerative manner, transistor 14 is switched to a conductive state and transistor 12 is switched to a non-conductive state. A binary "1" is now stored in the cell.

During the hold state, the power supply line S–1, is returned to its low level value of 0.8 volts. Additionally, the accessing line W–1 is also lowered to a value of approximately 0.1 volts and the B1–1 and the B0-1 lines are similarly lowered to their low valued state of approximately 0.3 volts. Transistor is now conducting, but current is flowing out of terminal 18 instead of terminal 22 due to the relative change of voltage levels at emitter terminals 18 and 22.

In order to read a binary "1" from the cell 10, both the S–1 and the W–1 lines are brought to an up state. Current flowing from the emitter terminal 18 is now switched to the emitter terminal 22 and sensed on the B1–1 line by an output sense amplifier connected thereto (not shown). This is illustrated by dotted voltage level of 0.7 volts which would be generated on the line B1–1 by the current flowing out of emitter 22 to a sense amplifier (not shown). Thereafter, the memory cell 10 returns to a hold condition as previously described.

In order to demonstrate the latent image or read-only capability of the memory array, it is now brought to a power off or non-sustaining level. This is indicated in FIG. 2A by the LIM 1 designation. At this time, information stored in memory is lost. All the lines S–N, W–N, B1–N and B0-N, are illustrated as being brought down to a level of 0.0 volts. The non-sustaining or power-off level is not necessarily 0.0 volts, but could be any value which destroys or erases the information stored in the memory array.

In order to set the upper left hand cell 10 to a latent image or a read-only binary "1" level, the power on lines S–1 and W–1 are brought from a non-sustaining or a power-off level to a level of approximately 1.9 volts. Both transistors 12 and 14 are initially in the off or non-conductive condition. The initial transient current begins to flow through each of the resistors 24 and 26. Resistor 26 is connected to a capacitor 30 having a larger value than the capacitor 32 connected to resistor 24. Therefore from a transient analysis standpoint, the initial surge of current will flow primarily through resistor 26 and to ground potential through capacitor 30, since capacitor 30 is virtually a short circuit. Capacitor 32 is smaller and thus it is not as effective as a short circuit to ground potential. As a consequence the collector terminal of transistor 14 is initially at a lower voltage than the voltage level at the collector of transistor 12. The higher voltage at the collector of transistor 12 tends to turn transistor 14 on by way of its directly cross-coupled connection, while transistor 12 remains relatively biased in a non-conductive state. A positive regenerative action is thus created and eventually results in transistor 14 being brought to a fully conductive condition and transistor 12 being maintained in a non-conductive state. The emitter terminal 18 is blocked due to the high voltage level at the W–1 line, but emitter terminal 22 is in a low state and therefore current flows out of B1–1 line. Although this current is not sensed at this instant of time, the existence of an associated voltage is illustrated in FIG. 2A by the dotted voltage level 105.

A latent image or read-only characteristic is assigned easily to any n out of m memory cells, e.g., cells 25, 27, 28 by selectively unbalancing them. For example, if it is desired to store a latent image binary 0 in the upper left hand cell 10 than capacitor 32 is made larger than capacitor 30 and the operation is similar to that previously described. Likewise, if no latent image is to be assigned to the memory cell 10, than the cell is fabricated such that the capacitors 30 and 32 have identical values. If no unbalanced impedance is added to the cell, then a transition from an operating condition to a power-off and then back to an operating state will cause any information stored in that cell to be randomly destroyed. The cell will return to a random state which may or may not be identical to the state in which it resided just prior to the power being turned off. Of course, the embodiment disclosure in FIG. 2 is structurally implement with bipolar transistors, but field-effect transistors (FET) would be equally applicable.

In order for the latent image memory to operate in an alterable read-only mode, it is necessary that the embodiment as disclosed in FIG. 2 be slightly varied. FIGS. 4, 4A, and 4B illustrate the operation and structure for achieving this alterable read-only capability.

Firstly, the read and write operations for the single cell shown in FIG. 4 are similar to that described with FIG. 2. By designation, a binary "0" is stored in the left hand section comprising FET transistor 60 while the right hand section including FET transistor 62 stores a binary "1." In order to read either a binary "0" or a binary "1" from the cell, lines 84 and 74 are brought to an up state while lines 80 and 82 are being sensed. During steady-state or hold condition pulse 72 is maintained at a positive voltage 73 just sufficient to keep transistors 64 or 66 in a slightly non-conductive state so as to minimize power consumption. During a write operation into the cell, the signal 72 is brought to a up level so as to turn transistors 64 or 66 on its more conductive state.

Simultaneously, therewith, one of the lines 80 or 82 is lowered while the other is raised so as to supply current and thus write a binary "1" or a "0" into the cell.

The values of capacitors 88 and 90 are selected to be of different values in order to store a latent image binary "1" or a latent image binary "0" in the cell. This theory operation is similar to that previously described with reference to FIG. 2. In addition, capacitor 88 can be made larger than capacitor 90, or vice versa, by the application of a polarizing voltage at node 68 or 70. In this manner, the latent image memory of the cell is selectively alterable depending on whether the gate to substrate capacitance is at a level of $C_1$ or $C_2$.

While the invention has been particularly shown and described with reference to the preferred embodiments, it will be understood by those skilled in the art that the foregoing and other changes in form and in detail may be made therein without departing from the spirit and scope of the invention.

What is claimed:

1. A monolithic latent image memory comprising:

a. m bistable memory cells for receiving information, b. accessing means, the accessing means operatively connected to said m bistable memory cells for reading and writing the information, c. a predetermined *n* of said m memory cells each including unbalancing impedance means, where *n* equals 1, or 2, . . . or *m*, d. said *m* memory cells being adapted to interconnect with a power supply, the power supply having an operating level and a non-sustaining level, e. the unbalancing impedance means of each of said predetermined *n* memory cells being responsive substantially at a transition from the non-sustaining level to the operating level for setting each of said predetermined *n* memory cells to a first predetermined state so that the *n* memory cells operate in both a read-write and a read-only mode, f. each of said *m* memory cells including a first section having a first impedance associated therewith and a second section having a second impedance associated therewith, g. said unbalancing impedance means comprising said first and second impedances, h. said first and second impedances being of different impedance value, i. said first and second impedances comprising parasitic capacitors for providing an AC impedance, j. a semiconductor substrate, k. said *m* memory cells being integral with said substrate, l. said memory cells comprising semiconductor devices having a plurality of electrode regions and respective electrode terminals, and m. said parasitic capacitors being located between said electrode terminals and said substrate.

2. A monolithic latent image memory as in claim 1 wherein:

a. said first and second sections each include transistor devices connected to their respective impedances, said first section operative to store one binary level, and said second section operative to store the opposite binary level.

3. A monolithic latent image memory as in claim 1 wherein said first and second impedances are unalterable.

4. A monolithic latent image memory as in claim 1 wherein:

a. said first and second impedances are variable so that said n memory cells are operative in an alterable read-only mode.

5. A monolithic latent image memory as in claim 1 wherein:

a. said parasitic capacitors comprise separate and variable capacitors so that said n memory cells operate in an alterable read-only mode.

6. A monolithic latent image memory as in claim 5 wherein:

a. each parasitic capacitor possesses at least two different variable states;

b. a terminal connected to said parasitic capacitors for applying a polarizing voltage, c. said terminal being responsive to the polarizing voltage to switch the capacitor to one of said states, and d. the polarity of the polarizing voltage being determinative of the state to which of said n memory cells is set in response to a transition from the non-sustaining level to the operating level.

7. A monolithic latent image memory as in claim 5 wherein:

a. said parasitic capacitors are MNOS devices.

* * * * *